D. M. HAIGHT.
DRIP-PANS FOR BARRELS.

No. 175,245. Patented March 28, 1876.

David Mosher Haight,
Inventor.

Witnesses:
Heinrich F. Bruns
L. M. Harris

By Coburn & Thacher
Attys.

UNITED STATES PATENT OFFICE.

DAVID M. HAIGHT, OF OSWEGO, ILLINOIS.

IMPROVEMENT IN DRIP-PANS FOR BARRELS.

Specification forming part of Letters Patent No. 175,245, dated March 28, 1876; application filed January 27, 1876.

*To all whom it may concern:*

Be it known that I, DAVID M. HAIGHT, of Oswego, in the county of Kendall and State of Illinois, have invented a new and useful Improvement in Drip-Pans for Barrels, which is fully described in the following specification, reference being had to the accompanying drawings, in which—

Figure 2:
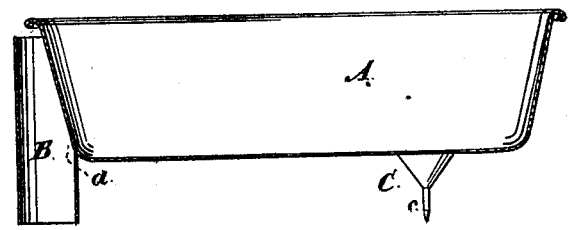
Figure 1:
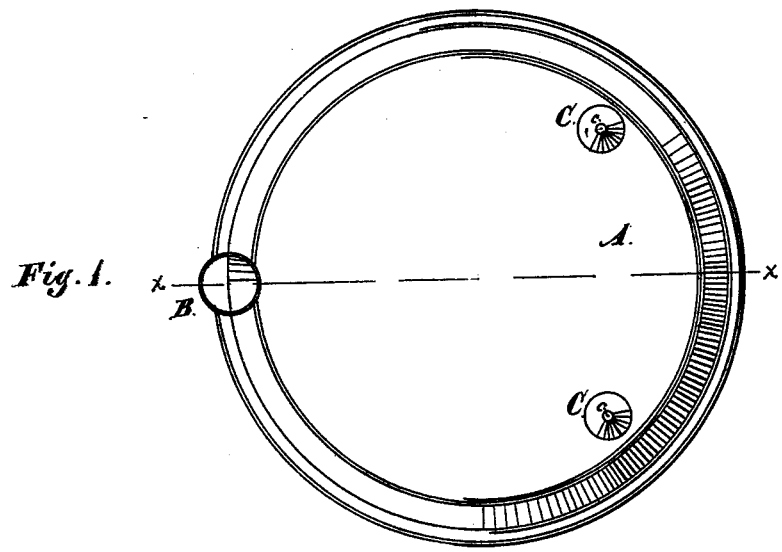

Figure 1 represents a view of the bottom of the pan; Fig. 2, a cross-section taken on the line $x$ $x$, Fig. 1; and Fig. 3, an enlarged sectional view, showing the construction of the adjustable supports for the pan.

The object of my invention is to provide a drip-pan which can be set upon the top of any barrel, and adjusted thereto, without the use of any additional fixture, to receive the measuring-vessels and other articles used in drawing out the contents of the barrel.

The invention consists in attaching to the bottom of the pan adjustable supports or rests, and also in arranging the return pipe for the drippings upon the side of the pan, as will be hereinafter fully described.

Figure 3:
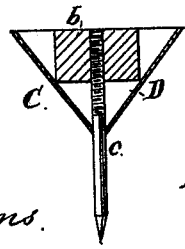

In the drawings, A represents a pan of any suitable size. At one side of this pan, and attached to the upright portion thereof, is a tube, B, which extends down some distance below the bottom of the pan, and a series of small holes are made through the bottom of the latter, as seen at $a$, so that the drippings may run out of the pan into the tube. Two or more adjustable feet or supports, C C, are attached to the bottom of the pan, on each side of a line passing through the tube B, and dividing the bottom of the pan centrally. The construction of these supports is shown in Fig. 3, in which D is a piece of metal in the form of an inverted cone, perforated at its apex. A screw-threaded nut, $b$, is placed within the cone D, and secured in position by filling the cone with solder or any other suitable metal, and the device is then soldered to the bottom of the pan in an inverted position, the base of the cone coming next to the pan. A piece of metallic wire, $c$, of suitable size, is cut with a screw-thread upon one end, and pointed at the other. This small rod or wire, being thrust into the aperture at the apex of the cone D, is inserted in the nut $b$, and may be adjusted vertically by means of the screw-thread in the nut and on the end of the rod.

The operation of this device is as follows: The pan is set upon the top of the barrel, the tube B being inserted either in the bung-hole, or in a hole made in the barrel especially for this purpose. The pan is arranged with the supports C toward one end of the barrel, one of the supports being on each side of the stave through which the drip-tube B passes. In this position the supports are adjusted by turning the rods $c$ up or down, as occasion may require, to give the pan the desired position and inclination. The lower ends of the supporting-pieces $c$ being pointed, they may be forced into the staves sufficiently to give the pan a firm attachment.

Heretofore, with the drip-pans in use, it has been necessary to attach pieces of wood or other material to the top of the barrel, on which to place the pan. By my invention this supplementary support is dispensed with, and, at the same time, the pan can be readily adjusted to barrels of any size. The drip-tube has also been attached, heretofore, directly to the bottom of the pan. By placing this tube upon the side of the pan, as described, the inside of the pan can be kept much cleaner, for, by giving the bottom a proper inclination, the drippings will all be returned, through the holes $a$ and the tube B, to the interior of the barrel.

Having thus fully described my invention, what I claim, and desire to secure by Letters Patent, is—

1. The pan A, with the holes $a$, provided with the drip-tube B, arranged at one side of the pan, and attached to the upright portion thereof, substantially as described.

2. A drip-pan, A, provided with adjustable supports C, substantially as and for the purposes set forth.

3. The combination, substantially as described, of the pan A, drip-tube B, and adjustable supports C.

4. The support C, consisting of the cone-shaped piece D, threaded nut $b$, and threaded rod or wire $c$, constructed and operating substantially as described.

DAVID MOSHER HAIGHT.

Witnesses:
FRANK STRASSMAN,
ALBERT PAGE.